(12) United States Patent
Potier

(10) Patent No.: US 9,140,362 B2
(45) Date of Patent: *Sep. 22, 2015

(54) FLEXIBLE GRAPHITE/METAL MULTILAYER GASKETS SUITED TO HIGH-TEMPERATURE SERVICE CONDITIONS

(75) Inventor: Alexandre Potier, Verneuil-sur-Seine (FR)

(73) Assignee: CARBONE LORRAINE COMPOSANTS, Gennevilliers (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/170,516

(22) Filed: Jun. 28, 2011

(65) Prior Publication Data

US 2012/0068414 A1 Mar. 22, 2012

Related U.S. Application Data

(63) Continuation of application No. 11/673,389, filed on Feb. 9, 2007, now Pat. No. 7,989,049.

(51) Int. Cl.
*B32B 9/00* (2006.01)
*B32B 3/10* (2006.01)
(Continued)

(52) U.S. Cl.
CPC ............... *F16J 15/122* (2013.01); *B32B 3/266* (2013.01); *B32B 7/02* (2013.01); *B32B 9/007* (2013.01);
(Continued)

(58) Field of Classification Search
USPC .................. 428/408, 461, 463, 213, 218, 138; 277/936, 939, 945, 312

IPC ................ F16J 15/122; Y10S 277/936,277/939
See application file for complete search history.

(56) References Cited

U.S. PATENT DOCUMENTS 3,841,289 A 10/1974 Meyers
4,443,567 A 4/1984 Sternisa et al.
(Continued)

FOREIGN PATENT DOCUMENTS

DE 9208943 9/1992
DE 198 04 283 8/1999
(Continued)

OTHER PUBLICATIONS

Sigraflex Universal; "Sealing Sheet Made From Impregnated Graphite With Perforated Stainless Steel Sheet Reinforcement"; SGL Carbon Group.
(Continued)

*Primary Examiner* — Kevin R Kruer
(74) *Attorney, Agent, or Firm* — Miles & Stockbridge P.C.

(57) ABSTRACT

The present invention relates generally to a composite plate produced by an alternating stack of (n+1) flexible graphite foils and (n) perforated metal reinforcing foils with spurs (where n≥2). The thicknesses of the flexible graphite foils used are preferably such that any 2 mm slice of thickness of the composite plate comprises at least 3 layers of flexible graphite, and has a graphite density per unit area of at least 2.34 kg/m². For each perforated metal reinforcing foil, the spurs present on the foil generally have a height in relation to the surface of that foil that does not exceed about 1.3 times the thickness of the thinnest of the flexible graphite layers to which it is attached. A composite plate of the present invention enables the manufacture of gaskets that resist temperatures up to 550° C. under continuous service.

17 Claims, 5 Drawing Sheets

X = 2 mm
Y = 0,5

(51) Int. Cl.
| | |
|---|---|
| F16J 15/02 | (2006.01) |
| F16J 15/12 | (2006.01) |
| B32B 15/20 | (2006.01) |
| B32B 7/02 | (2006.01) |
| B32B 9/04 | (2006.01) |
| B32B 15/06 | (2006.01) |
| B32B 15/08 | (2006.01) |
| B32B 15/085 | (2006.01) |
| B32B 15/18 | (2006.01) |
| B32B 25/04 | (2006.01) |
| B32B 27/32 | (2006.01) |
| B32B 3/26 | (2006.01) |
| C04B 37/02 | (2006.01) |

(52) U.S. Cl.
CPC ............... *B32B 9/041* (2013.01); *B32B 15/06* (2013.01); *B32B 15/08* (2013.01); *B32B 15/085* (2013.01); *B32B 15/18* (2013.01); *B32B 15/20* (2013.01); *B32B 25/04* (2013.01); *B32B 27/32* (2013.01); *B32B 27/322* (2013.01); *C04B 37/021* (2013.01); *B32B 2274/00* (2013.01); *B32B 2307/72* (2013.01); *B32B 2581/00* (2013.01); *C04B 2237/363* (2013.01); *C04B 2237/405* (2013.01); *C04B 2237/704* (2013.01); *C04B 2237/706* (2013.01); *Y10S 277/936* (2013.01); *Y10S 277/939* (2013.01); *Y10S 277/945* (2013.01); *Y10T 83/04* (2015.04); *Y10T 83/0524* (2015.04); *Y10T 428/2495* (2015.01); *Y10T 428/24331* (2015.01); *Y10T 428/24992* (2015.01); *Y10T 428/30* (2015.01); *Y10T 428/31678* (2015.04); *Y10T 428/31692* (2015.04); *Y10T 428/31699* (2015.04)

(56) References Cited

U.S. PATENT DOCUMENTS

| | | |
|---|---|---|
| 4,723,783 A | 2/1988 | Belter et al. |
| 4,822,062 A | 4/1989 | Gallo et al. |
| 5,128,209 A | 7/1992 | Sakai et al. |
| 5,172,920 A | 12/1992 | Schlenk |
| 5,249,518 A | 10/1993 | Abrams |
| 5,509,993 A | 4/1996 | Hirschvogel |
| 5,895,058 A | 4/1999 | Sanders |
| 6,258,457 B1 | 7/2001 | Ottinger et al. |
| 6,258,547 B1 | 7/2001 | Beri et al. |
| 6,565,099 B1 | 5/2003 | Ottinger et al. |
| 6,948,515 B2 | 9/2005 | Wadkins |
| 6,962,349 B2 | 11/2005 | Notter et al. |

FOREIGN PATENT DOCUMENTS

| | | |
|---|---|---|
| DE | 103 16 262 | 11/2004 |
| EP | 0 336 049 | 10/1989 |
| EP | 0616884 | 9/1994 |
| EP | 0640782 | 3/1995 |
| EP | 0 935 085 | 8/1999 |
| FR | 2625281 | 6/1989 |

OTHER PUBLICATIONS

Sigraflex; "Produkte Aus Flexibler Graphitfolie"; SGL Carbon Group.
Sigraflex University; "Verstaerkte Dichtungsplatte Aus Impraegniertem Graphit Mit Einer Einlage Aus Edelstahl-Spiessblech"; SGL Carbon Group.

FLEXIBLE GRAPHITE/METAL MULTILAYER GASKETS SUITED TO HIGH-TEMPERATURE SERVICE CONDITIONS

CROSS REFERENCE TO RELATED APPLICATION

This application is a Continuation of U.S. application Ser. No. 11/673,389, filed Feb. 9, 2007, which claims priority to FR 0601243, filed Feb. 10, 2006, the content of which is incorporated herein by reference in its entirety.

BACKGROUND OF THE INVENTION

1. Field of the Invention

The present invention relates generally to the field of manufacturing flat gaskets produced by alternating stacks of flexible graphite and perforated metal foils, which are capable of withstanding high-temperature conditions of 300° C. or more, for example, without undergoing deterioration in their quality, even under very high clamping stresses.

2. Description of Related Art

Flexible graphite is fabricated by thermal expansion of graphite (most often in the form of flakes), into which atoms or molecules have been inserted following attack in an acid medium; the material thereby obtained has a very low mass density and possesses the property of self-agglomerating without any binder, via a simple mechanical effect. In this way, a flexible or semi-rigid material in the form of rolls or plates is obtained by rolling or compression.

Flexible graphite foils have been used for a long time for the manufacture of flat gaskets. Such flat gaskets are used, for example, in chemical or petrochemical industry plants, for transporting hot and corrosive fluids, as well as in thermal or nuclear power plants, for transporting pressurized water vapour. The use of a flat gasket is shown schematically in FIG. 1. Two metal clamps (1, 2) join together two tubular pipes (5, 6) thus forming a pipeline. Clamping of the two metal clamps (1, 2) by means of bolts (3) situated along the periphery of the assembly enables pinching of the flexible graphite foil (4) acting as a gasket. The flexibility properties and the deformation capability of flexible graphite enable it to conform to the surfaces opposite the metal clamps and to ensure a proper seal between the interior of the pipeline (a) and the external environment (b). The thermal stability and high chemical inertness qualities of flexible graphite, particularly with respect to organic or acidic liquids, have made it the material of choice in many situations.

Thus, there are three determining characteristics with regard to the quality of flat gaskets: the sealing capability (expressed in the form of a leakage rate measured under normalised conditions), the maximum degradation temperature of the materials forming the gasket, and finally maintenance of the mechanical properties of the gasket structure within the operating temperature range of the materials forming it. The characteristics of the gasket must, on the one hand, always enable its adaptation to the surfaces against which it is pressed and, on the other hand, its creep resistance, in order to maintain the clamping pressure of the clamps over the course of time and temperature cycling, and to do so in order to guarantee the seal over time.

Despite the fact that certain qualities of flexible graphite withstand an air temperature as high as 500° C., or even 550° C., flexible graphite foils suffer from several disadvantages. They are difficult to handle, they tear relatively easily, and it is difficult to produce them in heavy thicknesses. The producers of flexible graphite foils have thus developed multi-material stacks, generally alternating stacks of metal foils and flexible graphite, in order to make it more practical to use the gaskets and to make them more mechanically strong. Today, it is very common to use a gasket consisting of a stack such as the one described in FIG. 2, wherein two flexible graphite foils (10, 11) are bonded to a middle metal foil (insert) (12). These gaskets are also stressed in the direction parallel to the layers that form them, due to the poorly distributed, heavy compressive stress over the entire surface of the gasket; this phenomenon is called "the toe-in of the clamp." Thus, they may have a creep problem, particularly at a high-operating temperature, when the thermal expansion deforms the geometry of the clamp. Creep is therefore likely to limit their lifespan and the seal of the system of which they are a part.

According to this principle, and primarily in order to further improve the mechanical strength of the gasket, numerous solutions have been proposed. Depending on the thicknesses of the gasket, these solutions involve stacks of 3, 5, 7 or more layers, various materials for the reinforcing foils (various metals, solid foils or perforated foils, or even grids), and various solutions to ensure the mechanical bond between the flexible graphite and the reinforcing foil. Among these bonding solutions, the two main technologies used can be cited: either a gluing or anchoring of mechanical holding means into the graphite foils. These mechanical holding means can be dome-like structures or spurs resulting from the perforation of a thin plate or metal foil with the aid of an awl (see the patent application FR 2 625 281 (Dana Corporation)).

In this association of materials of the type involving flexible graphite foils attached to a rigid metal structure, the flexible graphite foils ensure the function of deformability/conformation to the contact and sealing surfaces, while the metal reinforcements provide the advantage of strength to the entire assembly, and thereby enable easy handling (even for large-sized gaskets) and provide the assembly with a much improved creep resistance.

To fasten a flexible graphite foil onto a metal plate or foil, glues or adhesives can be used conventionally, but the latter cannot guarantee mechanical strength beyond 300° C. The patents EP 616 884, U.S. Pat. No. 5,509,993 and U.S. Pat. No. 6,962,349 (Sigri Great Lakes Carbon AG) disclose the use of substances that alter the interface between the metal and the graphite, but that are not glues, such as certain organosilicon compounds, perfluorinated compounds or metallic soaps. These products are adhesion promoters; they must be applied in a thickness of a few nanometers. In this way, a layer of metal is fastened to a layer of graphite without glue, using a hot-pressing technique, typically at a temperature ranging between 150° and 300° C. (see U.S. Pat. No. 6,258,457 (SGL Technik GmbH)). This technique, however, is very expensive to implement because it is not very productive, and it does not guarantee a sufficient degree of mechanical strength for the assembly beyond 400° C.

Another technical approach uses mechanical holding means that can be obtained by creating numerous dome-shaped perforations in the metal foil (see European Patent Application EP 0 640 782 A2 (Tako Payen S.p.a.), French Patent Application 2 625 281 (Dana Corporation), U.S. Pat. No. 4,723,783 (Dana Corporation), U.S. Pat. No. 6,258,457 (SGL Technik GmbH)). However, as taught by U.S. Pat. No. 5,509,993 cited above, the perforation of the dome-shaped plates causes local stresses in the plate, which can lead to ruptures under load. However, the stacks of flexible graphite foils attached to metal plates still have some weak points. First of all, the perforated metal reinforcements in strip thicknesses greater than or equal to 100 μm make it more difficult to cut out the gaskets, an operation that makes it possible to obtain the desired geometries from flat foils. In order to limit this disadvantage, the common practise is to limit the number of perforated metal reinforcements and to also limit their thickness. A single metal reinforcement is typically used, and sometimes two, for a total thickness of 3 mm. The strip thicknesses are more frequently close to 100 micrometers.

In summary, the solutions for bonding between layers by gluing on the one hand introduce an element (the glue) whose temperature-related strength is limited. Furthermore, they require production methods that are more difficult to implement than the simple roll-bonding used to bond together a perforated foil and a flexible graphite foil. On the other hand, glue-less assembly methods also exist, but these methods are likewise complex, because they make use of hot-pressing methods as well as the application of a very slight thickness of chemical products that alter the surface.

While roll-bonding can be easily understood as an operation producing a continuous "sandwich" of materials, gluing will require surface coating, drying and, most often, especially for glues capable of performing at temperatures of the order of 300° C., a heat treatment in order to stabilise the glues. This series of operations is either carried out in successive steps, or by means of a complex series of continuously operating equipment.

In any event, roll-bonding with a perforated plate seems to be the most economical continuous assembly method, but has significant disadvantages such as the difficulty of cutting via conventional means.

Generally, when the operating temperature exceeds 400° C., and when the pressures of the fluids being sealed off are too great, flat gaskets cut out of composite flexible graphite-based plates must be replaced by more reliable but also more costly solutions; however, these solutions are less dimensionally flexible, such as spiral gaskets, serrated gaskets and other metal gaskets.

Thus, a problem to which the present invention attempts to respond is to propose a new method for manufacturing plates and/or gaskets comprising an alternating stack of layers of flexible graphite and metal foils enabling easy cutting and easy and economical continuous production, and which has very good mechanical strength up to temperatures and pressures that have until now been impossible for flat flange gaskets, while at the same time guaranteeing a seal according to new and/or existing standards aiming to limit fugitive emissions of gases that are ecologically dangerous to the atmosphere.

SUMMARY OF THE INVENTION

An object of the present invention was to obtain a composite plate comprising an alternating stack of (n+1) flexible graphite foils and (n) perforated metal reinforcing foils with spurs, so that the first and the last foil of the alternating stack are flexible graphite foils. The composite plate further being characterised in that:
  a) n≥2;
  b) the thicknesses of the flexible graphite foils used can be equal or different, and are such that any 2 mm slice of thickness of the composite plate
    (i) comprises at least 3 layers of flexible graphite,
    (ii) has a density per unit area of at most 2.34 kg/m²;
  c) for each of perforated metal reinforcing foil, the spurs present on that foil have a height in relation to the surface of that foil that does not exceed 1.3 times the thickness of the thinnest of the flexible graphite layers to which it is attached.

Another object of the present invention relates to a flat gasket produced by cutting out a plate according to the invention to form a gasket.

Yet another object of the present invention relates to using such a gasket at a temperature not exceeding 600° C., and preferably at a temperature ranging between 350° C. and 550° C., and even more preferably at a temperature ranging between 400° C. and 500° C.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

Figure 1:
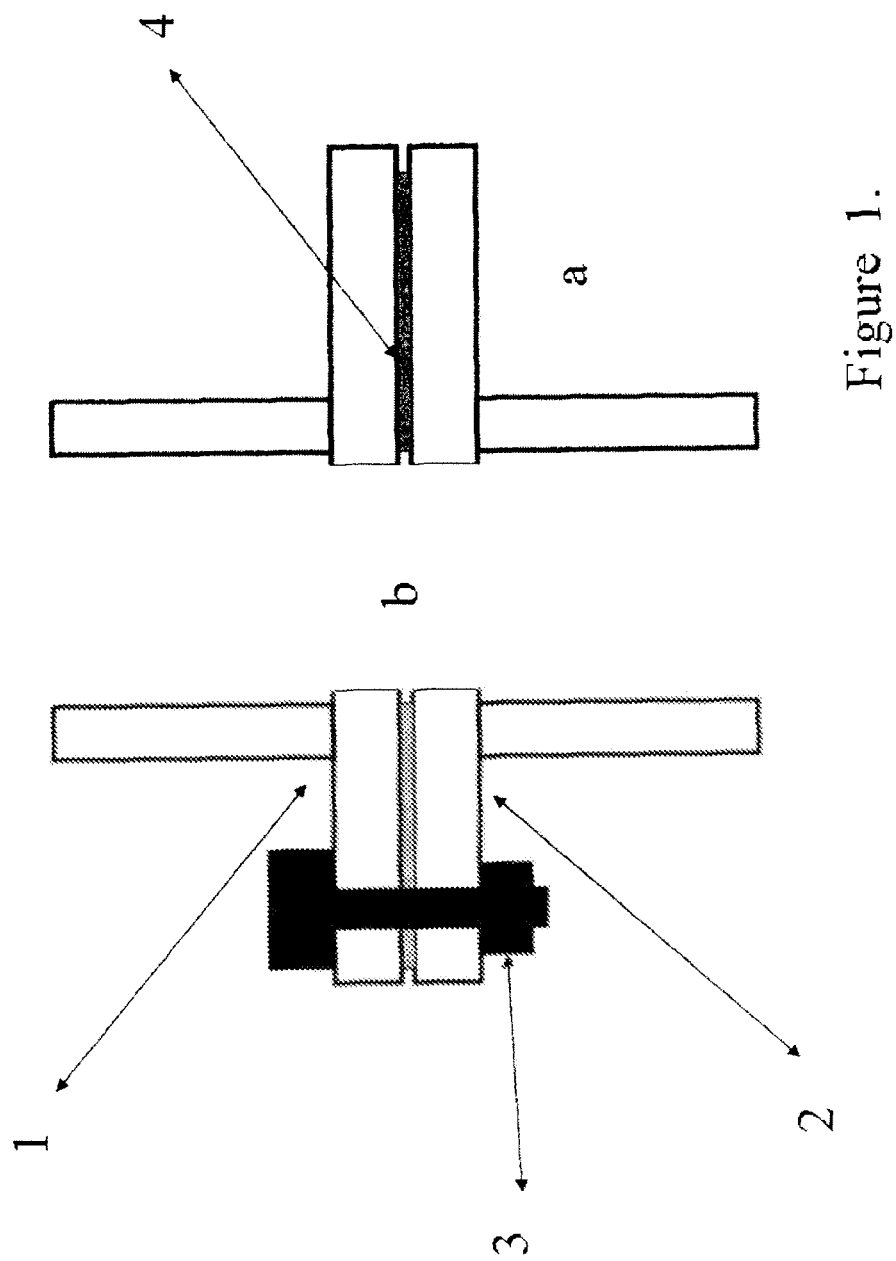
FIG. 1 shows a diagram of a flat gasket. The letter (a) indicates the interior of the pipeline; the letter (b) indicates the external environment.
Figure 2:
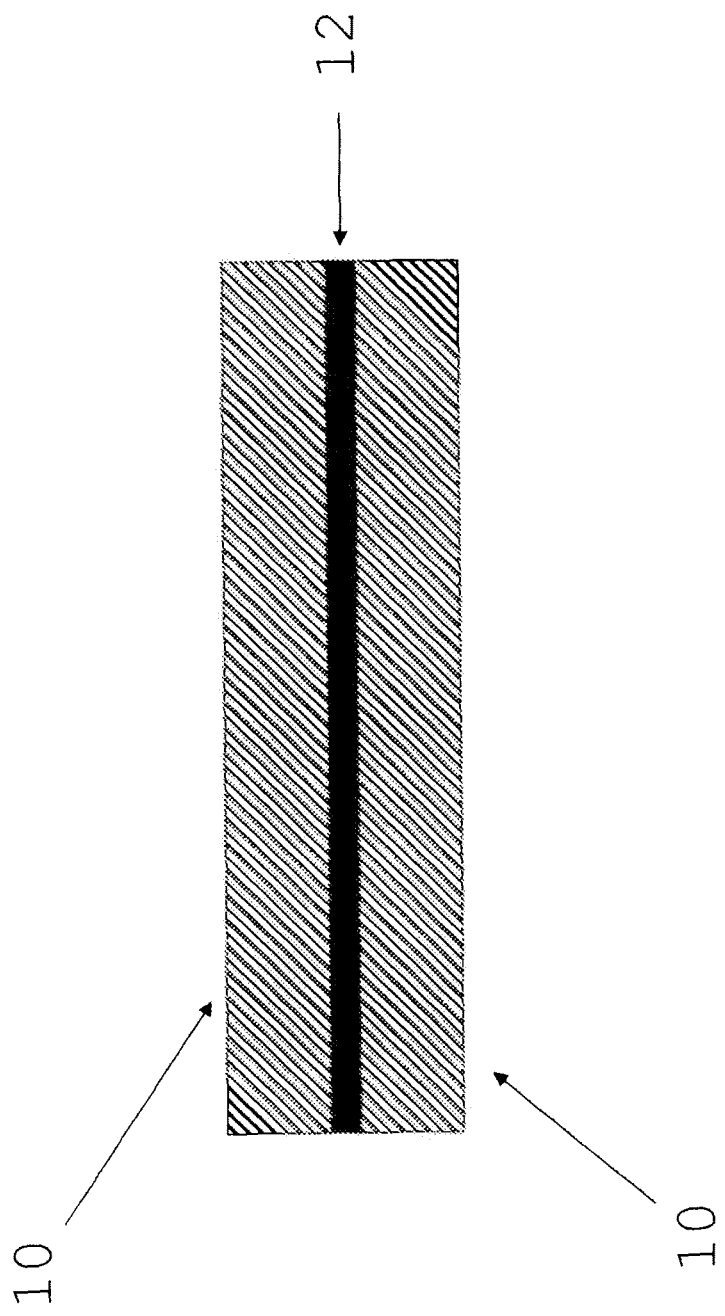
FIG. 2 shows a diagram of a stack of the flexible graphite/flexible metal insert/metal insert/graphite/flexible graphite type.
Figure 3:
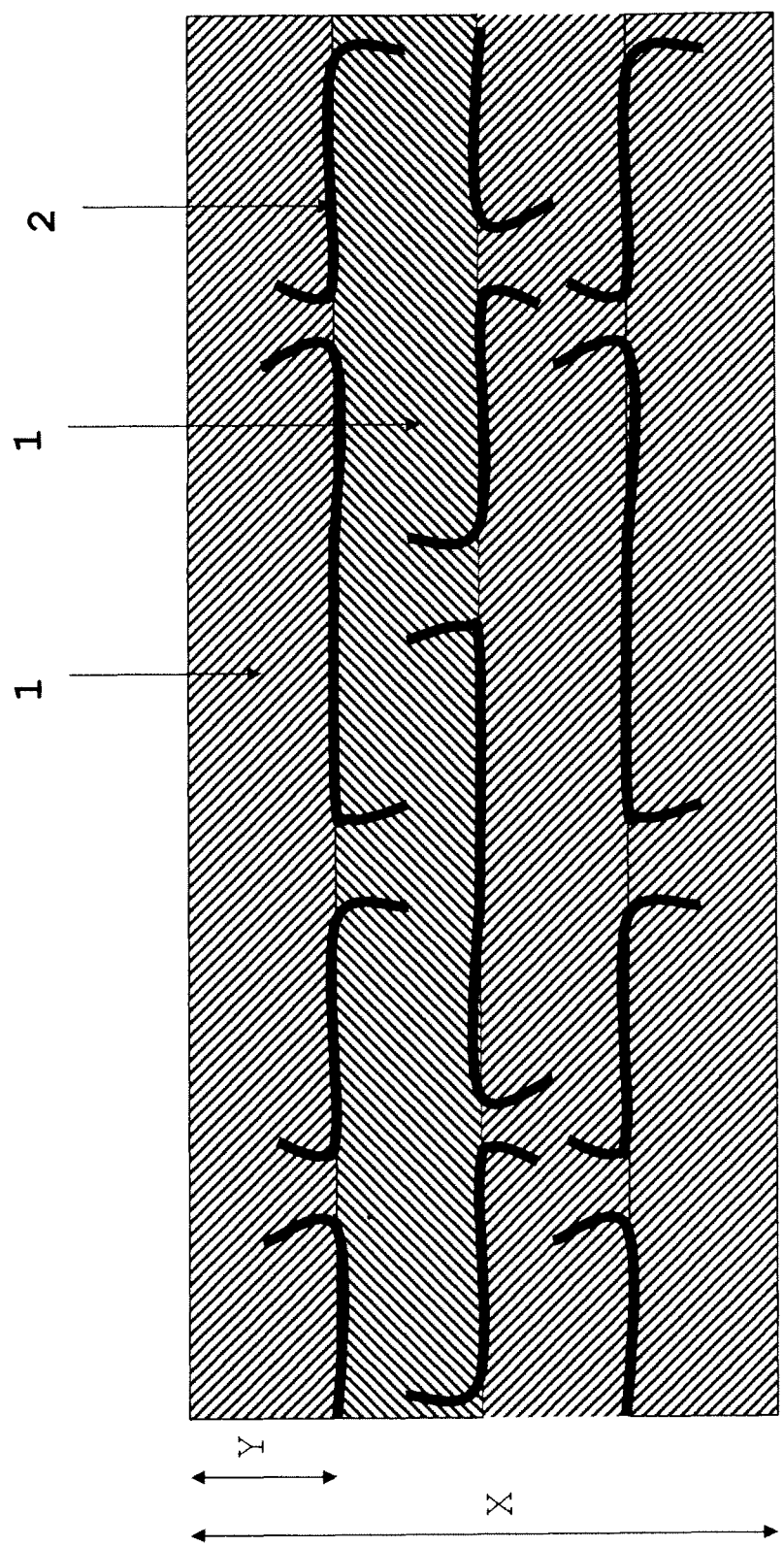
FIG. 3 shows a schematic cross section through a composite plate according to the present invention.

According to the present invention, one or more problems can be resolved by employing a plate that can be easily cut out into a flat gasket, which, at ambient temperature, has resistance to clamping pressure properties similar to or even superior to conventional multilayer assemblies, but which retains excellent mechanical properties up to temperatures close to the degradation limit of the materials (flexible graphite and metal). Whereas the known structural assemblies with or without glue typically cannot reasonably exceed a temperature of 400° C., by using a plate according to the present invention, it is possible to maintain these mechanical properties up to the oxidation temperature of graphite.

Any flexible graphite foil such as the known Papyex® I600° type, is suitable for manufacturing a plate according to the instant invention.

By using a sheet of the Papyex® I600° type, the present invention makes it possible to use flat flexible graphite gaskets for sealing off systems with high fluid pressures at temperatures that are at least 100° C. to 150° C. greater than with previously known products.

By depositing a slight thickness of a functionalizing agent on each interface between the metal and the graphite, the structure of an assembly according to the present invention also makes it possible to functionalize each interface between the metal and the graphite if desired, without thereby harming the excellent mechanical strength of said multilayer structure.

A principle of the present invention involves bonding together, via mechanical adhesion, flexible graphite foils and thin, perforated metal foils with spurs. The distinctiveness of the proposed solution is due to the combination of the following means:

(a) The composite plate includes (2n+1) alternating layers comprising (n+1) layers of flexible graphite and n layers of metal, with n≥2. In other words, there are at least 5 total layers, 3 of which are flexible graphite layers and 2 of which are metal layers. The external layers are flexible graphite layers. Thus, an embodiment with n=2 shows the following stack:

flexible graphite/reinforcing foil/flexible graphite/reinforcing foil/flexible graphite.

The thickness of the flexible graphite foils can be the same or different; in the same way, their densities can be the same or different.

(b) The metal reinforcing foils are foils whose individual thicknesses preferably do not exceed about 65 micrometers, more preferably not exceeding about 60 micrometers (0.6 mm). The nature and the thickness of each of the metal reinforcing foils can be the same or different. The material forming the metal reinforcing foils is advantageously selected from the group consisting of: steel, stainless steel, nickel, nickel alloys, aluminium, aluminium alloys, copper, and copper alloys.

(c) The metal foils are preferably perforated so as to produce spurs of low height, typically a height not exceeding about 860 micrometers in relation to the plane of the foil. If their height is much greater than that, the spurs may penetrate poorly into flexible graphite with a density of 1 g/cm$^3$, during a roll-bonding assembly step, if employed. The adhesion of the flexible graphite foil to the perforated insert with spurs may then no longer be sufficient to ensure optimal mechanical performance.

Figure 5:
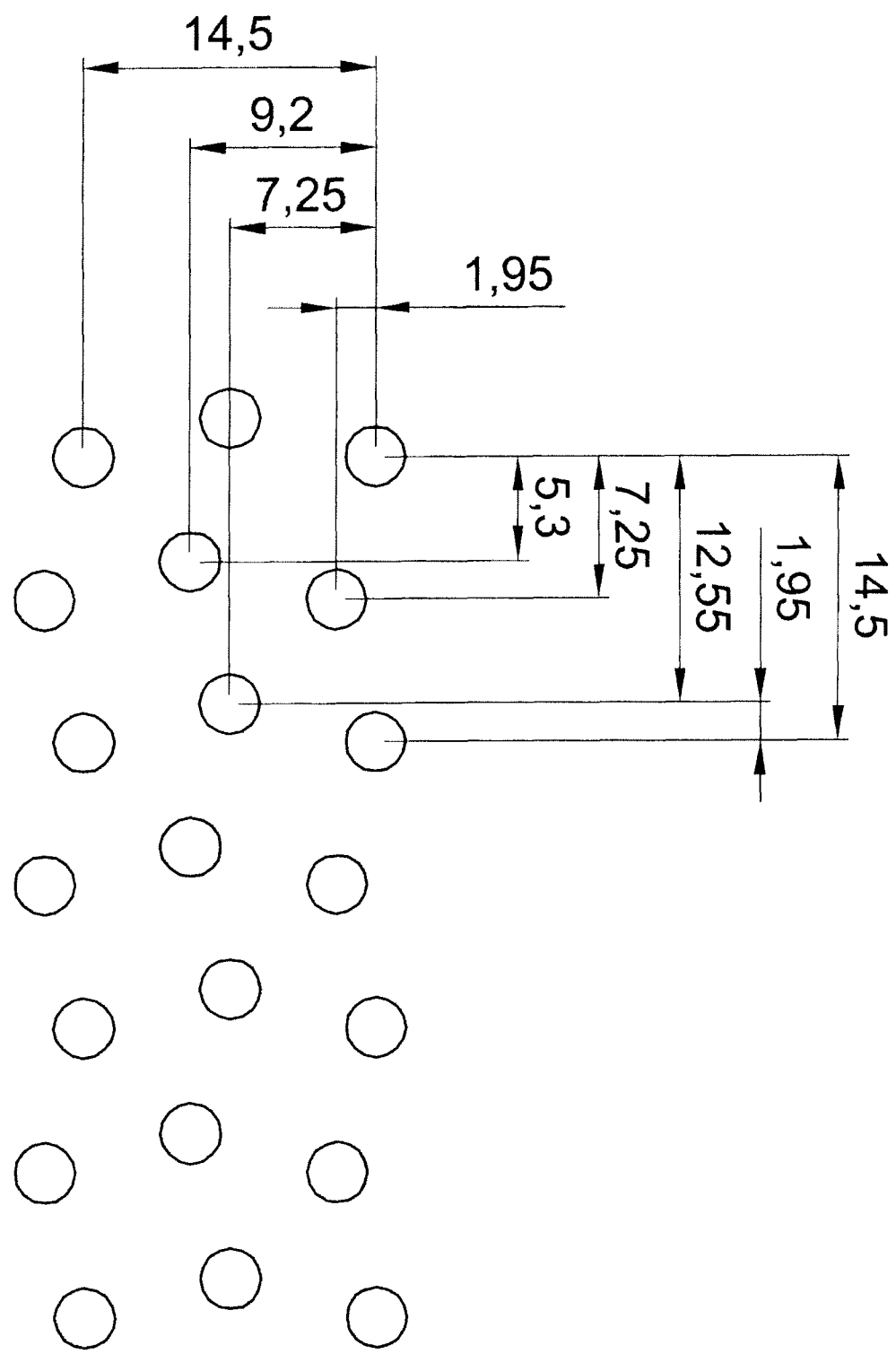
FIG. 5 shows an arrangement of the perforations in the metal plate for an embodiment according to the present invention. The dimensions are given in millimeters.

FIG. 5 shows an embodiment for a perforated metal foil that can be used within the scope of the present invention. Perforation of the metal foil can be carried out in any desired way, such as with a round needle having four sides: when it penetrates the metal, it pierces a hole by breaking the plate into four sections, which are then folded over in the forward-moving direction of the needle. In this way, a spur is obtained, which typically has four points the theoretical height of which is at most half the diameter of the hole. FIG. 5 shows the arrangement of the holes in a 50 μm stainless steel foil 316 according to one embodiment of the present invention. In order to subsequently obtain a multilayer structure that can be easily cut and that is sufficiently mechanically strong, a stainless steel foil can be used, which has a thickness ideally ranging between 40 and 60 μm. The diameter of the hole advantageously ranges between 0.8 and 1.72 mm.

d) The thicknesses of the flexible graphite foils are advantageously limited so that the number of layers of graphite is preferably not less than about 1.5 per millimeter of thickness of the total structure before compression between flanges.

By limiting the thicknesses of the reinforcing foils to 65 or 60 micrometers or less, it is possible to preserve a high degree of ease in cutting out the gaskets from solid surfaces, contrary to what is experienced with gaskets formed with multiple reinforcements having greater thicknesses. The present invention makes it possible to cut out shapes with simple tools such as: punches, a guillotine cutter or a cutting blade. Traditional solutions based on the use of foils having a thickness of 100 micrometers or more require the use of more sophisticated techniques such as waterjet cutting or the use of rotating tools on such multilayer structures. The ease of use that is possible with the present invention constitutes an appreciable advantage for the gasket cutters, in terms of economy operational flexibility.

In one particularly preferred embodiment, the composite plate includes flexible graphite foils that all have a thickness less than 0.6 mm, and all have a maximum density of not more than 1.3 g/cm$^3$.

In another particularly preferred embodiment, which can be combined with the preceding one if desired, the composite plate includes flexible graphite foils situated on the upper and lower surfaces of the stack that have been produced with flexible graphite having a density of which is lower than that of the other graphite foil or foils in the stack.

In yet another particularly preferred embodiment, the composite plate includes graphite foils situated on the external faces of the stack whose individual densities do not exceed about 0.7 g/cm$^3$.

The present invention possesses numerous advantages. A first advantage relates to the method for manufacturing the composite plate: there is no need for glue or any other binder. The glue or the binder are weak elements for prolonged use at high temperatures: there is no glue that can be used in industrial practice for prolonged periods of time at temperatures higher than about 300° C., while the assembly according to the method described by the U.S. Pat. No. 6,258,457 does not enable prolonged use beyond 400° C. It is believed that the '457 assembly would not be advantageous at temperatures above about 400 C for periods of greater than 24 hours.

A second advantage relates to the quality of the mechanical adhesion between the layers: due to the mechanical adhesion of products produced according to the present invention, creep risks for the flexible graphite foils are greatly reduced, due to a three-dimensional holding structure, even in the case of excessive clamping of the clamps. This creep in the direction parallel to the layers can occur between two layers or inside a layer of graphite. Creeping generally leads to an easing of the clamping stresses of the gasket, or even to the total destruction of the gasket.

Under conditions of a well known standardized test the details of which are described in example 2, it was found that a ring gasket (n=3) having a thickness of 2 mm, an outside diameter of 92 mm and an inside diameter of 49 mm has mechanical creep resistance up to a bearing pressure on the gasket greater than 200 MPa, preferably greater than 230 MPa and even more preferably greater than 250 MPa. Under the same standardized test conditions, a leakage rate less than $10^{-4}$ mb*l/s*m is measured, and preferably less than $5 \cdot 10^{-5}$ mb*l/s*m.

A third advantage relates to the temperature-related strength of a multilayer composite according to the invention. The solution of adhesion via anchoring according to the present invention makes it possible to produce multilayer structures with mechanical properties equivalent or even superior to those ordinarily offered on the market, using flat glued inserts having a thickness of 50 micrometers (Sigraflex® HD and Papyex® HP). It brings to these existing structures, in addition to an equivalent maximum permissible clamping stress, or even greater at ambient temperature, a much improved retention of this mechanical property under continuous heat up to 550° C. (generally about 660° C. at peak), when it is coupled with the Papyex® I600° grade of flexible graphite, or up to 500° C. for the standard Papyex® I980 grade. A composite gasket according to the present invention can be used at a temperature ranging from about 450° C. to about 550° C. for an accumulated time of more than 24 hours.

Another advantage relates to the fact that the mechanical anchoring method associated with the present invention is much simpler to carry out than known assembly methods, with or without glue or a binder. This makes it possible to obtain reduced manufacturing costs.

A constraint imposed by the presence of thin, flexible graphite foils in the structure, is that of keeping the height of the spurs resulting from perforating the metal to low heights. The height of a spur above the metal foil is advantageously less than about 1.3 times the thickness of the flexible graphite foils it is hooked onto. Beyond that value, it was observed during roll-bonding operations that there are tears in the foils and/or the presence of areas where the layers are poorly or scarcely bonded together, thus compromising the mechanical integrity of the gaskets cut out "astride" these defects.

It can be noted that the combination of all of these means leads to a new and advantageous result: composite plates which can be produced at low costs according to simple continuous methods, which can be cut out with a great deal of ease in order to obtain the desired gasket shapes, which do not contain any glue or thermally fragile element, and which, once cut out, will provide gaskets that are both very efficient in terms of sealing and mechanically insensitive to operating temperatures, as long as they do not reach values where the flexible graphite foils begin to oxidize (approximately 500° C., or even 550° C.).

Another important advantage of the present invention involves the possibility of modifying the interface between the flexible graphite and the metal insert, without thereby degrading the mechanical heat-resistance of the assembly. The inventor has discovered that even a deposition of substances capable of temperature-related degradation does not harm the mechanical strength of the gasket according to the described multilayer structure with spurs, provided that the thickness of this deposition on the insert does not exceed 10 μm. This functionalization can advantageously be at least one selected from the group consisting of:
   (a) deposition of a layer of nitrile rubber,
   (b) deposition of a layer or foil of polyolefin,
   (c) deposition of a layer or foil of fluoro-polymer, and
   (d) deposition of a layer or foil of thermoplastic fluoro-polymer elastomer.

As an example, a thin layer of an adhesive (3M75 type) was applied onto the graphite-metal interface. This layer makes it possible to yet further facilitate the cutting out of gaskets the track width of which is less than 10 mm, without risk of delamination during the punching operation.

This principle was applied to a low-cost perforated aluminium insert. In order to prevent risk of galvanic corrosion of the insert in contact with the graphite, the insert was protected via electrophoresis with a thin layer of anti-corrosive paint. The mechanical properties of the gasket thus manufactured remain equivalent to those of the unused structure, while at the same time overcoming the galvanic corrosion problems linked to the use of a low-cost metal insert (low-carbon steel, aluminium, etc.).

Within the scope of the present invention, other modifications in the graphite-metal interface are possible. These modifications are, for example, capable of improving the seal of the gaskets without degrading the mechanical strength thereof, thanks to the presence of a mechanical anchoring system as described above. Thus, the modification of the interface according to the present invention can involve other functionalization agents such as thermoplastic polymers (polyolefins, PTFE, etc.), thermoplastic elastomers (nitrile rubbers, etc.) and the like.

Figure 4:
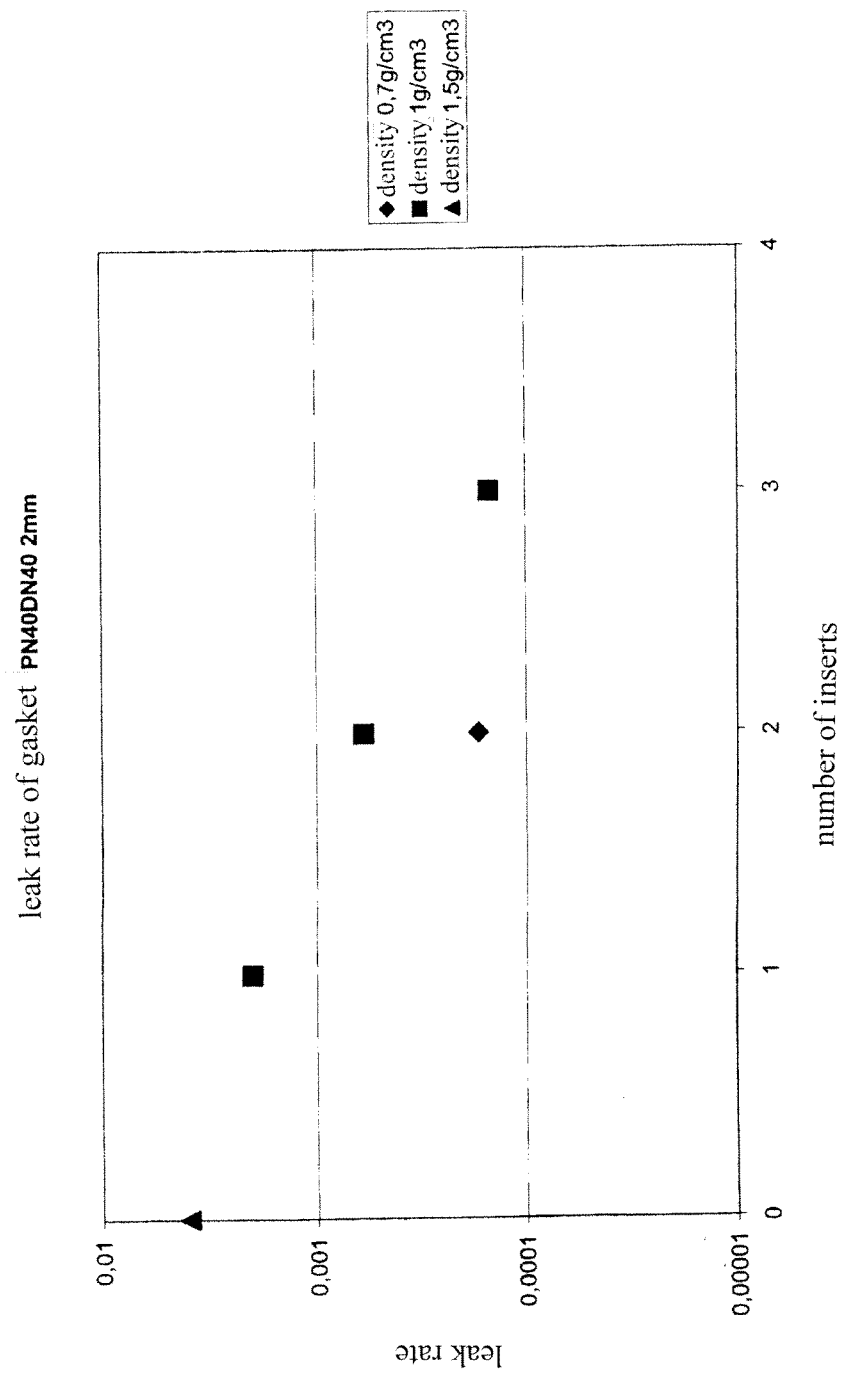
FIG. 4 shows the leakage rate observed during a standard test at 300° C. for gaskets having a thickness of 2 mm, cut from composite plates having different structures (number of metal foils, three different values for the density of the graphite).

It was observed that, given the same total thickness and equal clamping pressure between clamps, a gasket prepared from a composite plate according to the instant invention is capable of obtaining a higher level of sealing the more layers and thus functionalized interfaces are used in the stack. This result is illustrated by the curve provided in FIG. 4. Thus, for a gasket having a total thickness of 2 mm, a stack of 3 layers of flexible graphite having a density close to 1 g/cm³ and 2 layers of metal with the following thicknesses:

0.65 mm/0.05 mm/0.6 mm/0.05 mm/0.65 mm will obtain, at equal clamping pressure, a degree of sealing significantly better than a stack of three layers of the same flexible graphite and one layer of the same metal with the following thicknesses:

0.90 mm/0.05 mm/0.90 mm, all things otherwise being equal (same type of reinforcing foils, same adhesion technique, same type of flexible graphite and metal foils, similar thickness).

The present invention makes it possible to produce gaskets having a maximum permissible stress $QS_{max}$, determined according to the standard EN 13555, at 400° C., which is not less than about 180 MPa, and preferably greater than 190 MPa. In one particular embodiment, at least one of the external faces of the gasket is coated with an anti-adhesive or an adhesive coating, depending on what is desired.

The invention will be better understood with the aid of the examples, which, however, are not of a limitative nature.

EXAMPLES

Example 1

A composite plate was made by alternately stacking four flexible graphite foils produced by the Carbone Lorraine Corporation, Papyex® I600° grade, with a density of 1 g/cm³, a thickness of 0.5 mm (foils supplied in rolls of 1 m in width and 300 m in length), and three stainless steel foils, grade 316, with a thickness of 50 micrometers, perforations via 1.2 mm diameter, evenly distributed holes with a density of 4 perforations per cm², and a height of the spurs resulting from the perforations of 650 micrometers above the plane of the foils (1 m wide and 300 mm long foils supplied in reels). The final thickness of the gasket is 2 mm.

After the gasket has been kept at 550° C. for 48 hours, under a prestressing of 20 MPa, the measurement of the maximum permissible stress $QS_{max}$ at 550° C. yields a value close to 200 MPa, according to the standard EN 13555.

Example 2

A composite plate was made by alternately stacking four flexible graphite foils produced by the Carbone Lorraine Corporation, Papyex® I980 grade, with a density of 1 g/cm³, a thickness of 0.5 mm (foils supplied in rolls of 1 m in width and 300 m in length), and three stainless steel foils, grade 316, with a thickness of 50 micrometers, perforations via 1.2 mm diameter, evenly distributed holes with a density of 4 perforations per cm², and a height of the spurs resulting from the perforations of 650 micrometers above the plane of the foils (1 m wide and 300 mm long foils supplied in reels). These steel foils are coated on both sides with a 5 μm thickness of nitrile rubber.

Composite plates have been made via continuous roll-bonding of seven layers (4 layers of flexible graphite, 3 perforated metal layers), with a total thickness of approximately 2 mm. At the end of the roll-bonding operation, the products are kept flat and cut into plates measuring 1 m×1 m.

Some of these plates were cut into ring gaskets with the aid of ordinary punches. A gasket such as this, having an outside diameter of 92 mm and an inside diameter of 49 mm (total thickness of 2 mm) was characterised under the following conditions, according to the standard VDI 2440:
- clamping between standard E DN40/PN40 shaped flanges in accordance with DIN 2635;
- external pressure exerted on the faces of the gasket: 30 MPa;
- temperature cycling of the gasket/flange assembly: once between 25° C. and 300° C.; held at 300° C. for 48 hrs.
- measurement of the leakage rate with the gasket/flange assembly: helium pressure inside the flanges of 1 bar.

The leakage rate was $6\ 10^{-5}$ mb*l/s*m.

By way of comparison, a composite plate was made from a stack of the same material, but with only 3 layers with the following thicknesses:
1 mm/0.1 mm/1 mm.

The leakage rate, measured for a gasket with the same dimensions and under the same operating conditions, was $2*10^{-3}$ mb*l/s*m.

The strong mechanical creep resistance in the direction parallel to the layers, up to a bearing pressure on the gasket of 250 MPa, for this type of multilayer-structured gasket, is consistent with that measured on equivalent structures manufactured from a successive assembly of a flat strip glued onto flexible graphite foils.

However, it was found that the gasket according to the invention retains this creep resistance up to a temperature of 500° C. when in continuous service and exposed to the air, while a gasket without mechanical adhesion, according to the prior art, shows significant creep at lower temperatures.

Measurement of the maximum permissible stress $QS_{max}$ at 400° C. yields a value close to 200 MPa, according to the standard EN 13555.

This measurement surpasses the usual measurements on assemblies according to the prior art. Then the values for $QS_{max}$ at 400° C. do not exceed 150 MPa.

Example 3

Conventional multilayer structures (such as: Sigraflex Select and HD, or Papyex® HP) do not further make it possible to combine a seal conforming to the standard VDI 2440 (TA Luft), with a mechanical strength at high temperatures such as this and high mechanical performance, without the addition of a metal ring sealing off the internal section of the gasket, as described in U.S. Pat. No. 6,962,349, which is incorporated herein by reference in its entirety.

The gasket being cut to size from the plate by the user does not then make it possible to guarantee the leakage level for the cut-out gasket that is required by regulations, without mastering the method of adding the ring.

However, it can be noted that the structure according to the present invention, combined with using the metal ring, makes it possible to obtain results conforming to the standard VDI 2440 (TA Luft), even without the addition of functionalizing agents, and this is so despite the fact that all of the metal layers are perforated, contrary to what is described in U.S. Pat. No. 6,962,349.

The leakage rate measured was $8.9\ 10^{-5}$ mb*l/s*m on a 2 mm thick multilayer structure comprising 3 perforated metal reinforcements of the same type as in the preceding examples. The graphite of the outside layer is made of Papyex® 1980 having a thickness of 0.5 mm and a density of 0.7 g/cm³, while the inside layers have a density of 1.1 g/cm³ with a thickness of 0.6 mm.

Example 4

A composite plate according to the present invention was made by alternately stacking six flexible graphite foils produced by the Carbone Lorraine Corporation, Papyex® N998 grade, with a density of 1 g/cm³, a thickness of 0.5 mm (foils supplied in rolls of 1 m in width and 300 m in length), and five stainless steel foils, grade 316, with a thickness of 50 micrometers (1 mm wide and 300 mm long foils supplied in reels). The steel foils comprised perforations via 1.2 mm diameter, evenly distributed holes with a density of 4 perforations per cm²; the height of the spurs resulting from the perforations was 650 micrometers above the plane of the foils.

Composite plates were produced via continuous roll-bonding of eleven layers (6 flexible graphite layers, 5 perforated metal layers), with a total thickness of approximately 3 mm. At the end of the roll-bonding operation, the products were kept flat and cut into plates measuring 1 m×1 m.

3 large-diameter gaskets measuring 540 mm on the outside and 406.5 mm on the inside, cut out from these composite plates, were compressed under a bearing pressure of 120 MPa. These gaskets were held at a temperature of 350° C. for 2 hours. After returning to ambient temperature, measurements were taken of the relative variation in thickness $\Delta e/e$ and the relative variation in surface area $\Delta s/s$. This makes it possible to evaluate the hot creep of the gaskets on the basis of geometric criteria.

The results are recorded in the following table:

| Measurements | Gasket 1 | Gasket 2 | Gasket 3 |
|---|---|---|---|
| $\Delta e/e$ | 6.65% | 5.71% | 7.10% |
| $\Delta s/s$ | 1.01% | 0.67% | 0.59% |

Under these clamping and temperature conditions, and despite the effects of differential expansion between the various layers of graphite and metal, this large-sized gasket resists the creep phenomenon perfectly.

No flat, flexible graphite-based gasket attains values as low as this. The majority will have a $\Delta e/e>10\%$ and a $\Delta s/s>5\%$.

Thus, the mechanical anchoring of the various layers offers this product a greater degree of mechanical strength in comparison to other existing solutions, and, above all, does so at temperatures greater than 350° C.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A flat gasket produced by cutting out a composite plate consisting essentially of an alternating stack of at least 3 flexible graphite foils and at least 2 perforated metal reinforcing foils with spurs, such that a first and a last foil of said alternating stack comprise flexible graphite foils, wherein the thickness of each of said flexible graphite foils is the same or different, wherein (a) any 2 mm slice of thickness of the composite plate (i) comprises at least 3 layers of flexible graphite, and (ii) has a density per unit area of not more than 2.34 kg/m2;

(b) for each of said perforated metal reinforcing foils, the spurs present on said foil have a height in relation to the surface of said foil that does not exceed about 1.3 times the thickness of the thinnest flexible graphite layer to which said foil is attached; and (c) the individual thickness of said metal reinforcing foils is between 40 and 60 μm, wherein said metal reinforcing foils comprise at least one selected from the group consisting of: steel, stainless steel, nickel, nickel alloys, aluminium, aluminium alloys, copper and copper alloys, and wherein said flat gasket has a maximum permissible stress QSmax determined in accordance with standard EN 13555, at 400° C., which is at least 180 MPa.

2. A flat gasket as claimed in claim 1, wherein flexible graphite foils are situated on upper and lower surfaces of said alternating stack and said upper and lower surface foils are produced with flexible graphite possessing a density which is less than the density of another graphite foil in said alternating stack.

3. A flat gasket as claimed in claim 1, wherein the density of each graphite foil situated on an external face of the stack does not exceed 0.7 g/cm3.

4. A flat gasket as claimed in claim 1, wherein the composite plate further consists essentially of at least one functionalized metal/graphite interface with a thickness of not more than 10 μm.

5. A flat gasket of claim 4, wherein said functionalized interface is at least one selected from the group consisting of:
   a) deposition of a layer of nitrile rubber,
   b) deposition of a layer or foil of polyolefin,
   c) deposition of a layer or foil of fluoro-polymer, and
   d) deposition of a layer or foil of thermoplastic fluoro-polymer elastomer.

6. A flat gasket as claimed in claim 1, produced from a composite plate comprising a thickness of approximately 2 mm, and said plate being capable of producing a ring gasket that has an outside diameter of 92 mm and an inside diameter of 49 mm, which has creep resistance up to a bearing pressure on the gasket of at least 200 MPa, determined under the following conditions:
   clamping between standard E DN40/PN40 shaped flanges in accordance with DIN 2635;
   external pressure exerted on the faces of the gasket: 30 MPa;
   temperature cycling of the gasket/flange assembly: once between 25° C. and 300° C.; held at 300° C. for 48 hrs.
   measurement of the mechanical strength QSmax according to the standard EN 13555.

7. A gasket as claimed in claim 1, wherein said gasket has a leakage rate, measured with the gasket/flange assembly, at a helium pressure inside the flanges of 1 bar, which is not more than 10-4 mb*l/s*m, determined under the following conditions:
   clamping between standard E DN40/PN40 shaped flanges in accordance with DIN 2635;
   external pressure exerted on the faces of the gasket: 30 MPa;
   temperature cycling of the gasket/flange assembly: once between 25° C. and 300° C.; held at 300° C. for 48 hrs.

8. A flat gasket as claimed in claim 1, wherein said flat gasket comprises a ring gasket said ring gasket having a creep resistance parallel to the layers that is at least 200 MPa, determined on a ring gasket having a thickness of 2 mm, an outside diameter of 92 mm, an inside diameter of 49 mm, under bearing pressure on the ring gasket, under the following conditions:
   clamping between standard E DN40/PN40 shaped flanges in accordance with DIN 2635;
   external pressure exerted on the faces of the gasket: 30 MPa;
   temperature cycling of the gasket/flange assembly: once between 25° C. and 300° C.; held at 300° C. for 48 hrs.
   measurement of the mechanical strength $QS_{max}$ according to the standard EN 13555.

9. A gasket as claimed in claim 1, wherein at least one external face thereof is coated with an adhesive.

10. A flat gasket of claim 1, wherein said flexible graphite foils are each of a thickness not more than 0.6 mm.

11. A gasket of claim 1 that conforms to VDI 2440 (TA Luft).

12. A flat gasket of claim 1, wherein said flexible graphite foils are each of a thickness not more than 0.65 mm, and each having a maximum density of 1.3 g/cm3.

13. A flat gasket as claimed in claim 12, wherein flexible graphite foils are situated on upper and lower surfaces of said alternating stack and said upper and lower surface foils are produced with flexible graphite possessing a density which is less than the density of another graphite foil in said alternating stack.

14. A flat gasket as claimed in claim 12, wherein the density of each graphite foil situated on an external face of the stack does not exceed 0.7 g/cm3.

15. A flat gasket as claimed in claim 12, wherein the composite plate further consists essentially of at least one functionalized metal/graphite interface with a thickness of not more than 10 μm.

16. A method for forming a seal at a temperature of not more than 600° C., comprising employing a gasket of claim 1 to accomplish said seal.

17. A method for forming a seal at a temperature ranging between 450° C. and 550° C., for an accumulated time of at least 24 hours comprising employing a gasket of claim 1 to accomplish said seal.

* * * * *